(12) United States Patent
Tabata (10) Patent No.: US 9,254,441 B2
(45) Date of Patent: Feb. 9, 2016

(54) GAME APPARATUS

(71) Applicant: KABUSHIKI KAISHA SQUARE ENIX, Tokyo (JP)

(72) Inventor: Hajime Tabata, Tokyo (JP)

(73) Assignee: KABUSHIKI KAISHA SQUARE ENIX, Tokyo (JP)

( * ) Notice: Subject to any disclaimer, the term of this patent is extended or adjusted under 35 U.S.C. 154(b) by 0 days.

(21) Appl. No.: 13/657,072

(22) Filed: Oct. 22, 2012

(65) Prior Publication Data
US 2013/0109472 A1 May 2, 2013

(30) Foreign Application Priority Data

Oct. 26, 2011 (JP) .................. 2011-235470

(51) Int. Cl.
| A63F 13/10 | (2006.01) |
| A63F 13/44 | (2014.01) |
| A63F 13/40 | (2014.01) |
| A63F 13/47 | (2014.01) |

(52) U.S. Cl.
CPC ............... *A63F 13/44* (2014.09); *A63F 13/40* (2014.09); *A63F 13/47* (2014.09); *A63F 13/10* (2013.01); *A63F 2300/305* (2013.01); *A63F 2300/638* (2013.01); *A63F 2300/807* (2013.01)

(58) Field of Classification Search
CPC ............... A63F 13/10; A63F 2300/10; A63F 2300/638; A63F 2300/6045; A63F 13/40; A63F 13/44; A63F 13/47
USPC .......................................... 463/31
See application file for complete search history.

(56) References Cited

U.S. PATENT DOCUMENTS

| 6,267,674 | B1 | 7/2001 | Kondo et al. |
| RE37,948 | E * | 12/2002 | Sakaguchi et al. ............. 463/43 |
| 6,652,384 | B2 | 11/2003 | Kondo et al. |
| 8,012,007 | B2 | 9/2011 | Yoshida |

(Continued)

FOREIGN PATENT DOCUMENTS

| JP | 2007-054171 | 3/2007 |
| JP | 2007-244741 | 9/2007 |
| JP | 2011-101765 | 5/2011 |

OTHER PUBLICATIONS

Moves—Infinity Blade Wiki [online]. Revision May 11, 2011 [retrieved on Dec. 20, 2013]. Retrieved from the Internet: <URL: http://infinityblade.wikia.com/wiki/Moves?oldid=4501#>.*

(Continued)

*Primary Examiner* — Dmitry Suhol
*Assistant Examiner* — David Duffy
(74) *Attorney, Agent, or Firm* — Greenblum & Bernstein, P.L.C.

(57) ABSTRACT

The present invention is directed to provide a game apparatus and a game program, which are capable of more strategically conducting a battle with an enemy character, deepening interest, winning a battle with a formidable enemy even without any level up, and enjoying a game that is rich in strategic feature. When an enemy character starts to attack a player character (step S11), time counting to set a chink occurrence flag starts. When an attack operation of the player character on the enemy character is received (step S12) and the attack hits the enemy character (step S13), it is determined whether or not a chink occurrence flag remains set on the enemy character (step S14). When the chink occurrence flag remains set (YES in step S14), a special effect is generated (step S15).

20 Claims, 8 Drawing Sheets

| TYPE | ACTION | ACTION EFFECT | CHINK OCCURRENCE TIME PERIOD | SPECIAL EFFECT |
|---|---|---|---|---|
| SOLDIER | SLASHING | — | 0.5 TO 0.75 1.2 TO 2 | TWICE DAMAGE |
| | STABBING | — | 0 TO 2 | TRIPLE DAMAGE |
| | JUMP SLASHING | PARALYSIS | 0 TO 3 | SINGLE BLOW |
| DRAGON | FLAME | — | 2 TO 3 | TWICE DAMAGE |
| | ATTACK MAGIC | — | 0 TO 2 2.5 TO 3 | TWICE DAMAGE |
| | | | | |

(56) References Cited

U.S. PATENT DOCUMENTS

| | | | |
|---|---|---|---|
| 8,100,765 | B2 | 1/2012 | Yamada et al. |
| 2001/0029202 | A1* | 10/2001 | Kondo et al. ............. 463/31 |
| 2004/0214623 | A1* | 10/2004 | Takahashi et al. .......... 463/2 |
| 2007/0060234 | A1 | 3/2007 | Yamada et al. |
| 2008/0102950 | A1* | 5/2008 | Ishii et al. ............. 463/31 |
| 2012/0196678 | A1 | 8/2012 | Fujisawa et al. |

OTHER PUBLICATIONS

Last Ranker The Complete Guide, ASCII Media Works Inc., Aug. 31, 2010, First printing, pp. 012-015 and 040-046, together with an English language translation thereof.

SE—Mook Star Ocean 2 Second Evolution Official Complete Guide, Square Enix Co., Ltd., Feb. 5, 2009, 4th Printing, pp. 044-047, 051-058, and 068-069, together with an English language translation thereof.

Metroid Other M, Weekly Famitsu, Enterbrain Inc., Jul. 29, 2010, vol. 25, 32nd issue, pp. 234-237, together with an English language translation thereof.

Neo Geo Winning Strategy Special the King of Fighter '95, Keibun Sha, Nov. 25, 1995, First printing, pp. 30-32 and 50-53, together with an English language translation thereof.

Office Action from Japan Patent Office (JPO) in Japanese Patent Application No. 2011-235470, dated Aug. 20, 2013, together with an English language translation thereof.

Extended European Search Report from European Patent Office in Eurpoean Patent Application No. 12189615.3, dated Mar. 20, 2013.

U.S. Appl. No. 13/603,950 to Yusuke Matsui et al., which was filed on Sep. 5, 2012.

* cited by examiner

| | 41 | 42 | 43 | 44 | 45 | 46 |
|---|---|---|---|---|---|---|
| | NAME | TYPE | REMAINING HIT POINT | OFFENSIVE POWER | DEFENSIVE POWER | CHINK OCCURRENCE FLAG |
| 40 | SOLDIER A | SOLDIER | 75 | 28 | 24 | 1 |
| | SOLDIER B | SOLDIER | 20 | 28 | 24 | 0 |
| | | | | | | |

FIG. 4

| TYPE | ACTION | ACTION EFFECT | CHINK OCCURRENCE TIME PERIOD | SPECIAL EFFECT |
|---|---|---|---|---|
| SOLDIER | SLASHING | — | 0.5 TO 0.75 1.2 TO 2 | TWICE DAMAGE |
| | STABBING | — | 0 TO 2 | TRIPLE DAMAGE |
| | JUMP SLASHING | PARALYSIS | 0 TO 3 | SINGLE BLOW |
| DRAGON | FLAME | — | 2 TO 3 | TWICE DAMAGE |
| | ATTACK MAGIC | — | 0 TO 2 2.5 TO 3 | TWICE DAMAGE |
| | | | | |

GAME APPARATUS

CROSS REFERENCE TO RELATED APPLICATION

The present disclosure relates to subject matter contained in Japanese Patent Application No. 2011-235470, filed on Oct. 26, 2011, the disclosure of which is expressly incorporated herein by reference in its entirety.

BACKGROUND OF THE INVENTION

1. Field of the Invention

The present invention relates to a game apparatus that causes a game to progress by causing a player character to conduct a virtual battle with an enemy character, a game program and a game progress method.

2. Description of the Related Art

In the past, action games or fighting games in which a game progresses such that a player character operatable by a player conducts a virtual battle with an enemy character have been enjoyed. In the action game or the fighting game, for example, a typical attack having a weapon or a bare hand is combined with a special attack that has offensive power more powerful than a typical attack or generates some sort of certain special effect in order to cause a virtual battle to strategically progress. In addition, in order to provide an action game that is rich in strategic feature, a game program in which when the enemy character receives an attack by the player character, it is determined whether or not a hit point of the enemy character is within a predetermined range, and when the hit point is within the predetermined range, the hit point of the enemy character becomes zero (0) regardless of the magnitude of damage has been disclosed (see JP 2007-54171 A).

Meanwhile, in recent years, action role playing games (RPGs) in which factors of an action game are incorporated into an RPG have been enjoyed by many players. In the action RPG, similarly to a typical action game, the player character conducts a virtual battle with the enemy character while moving the position of the player character in the virtual world by operating the player character or using a hitting attack by a weapon such as a sword or an ax or a bare hand, a magic attack having an effect of flame or thunder, or the like. Here, when the player character wins the virtual battle with the enemy character, the player character acquires an experience value or an item, and the player character grows based on the acquired experience value.

In the action RPG as described above, when a battle with a formidable enemy such as a boss character having a overwhelmingly higher status in offensive power, defensive power, or a hit point than the player character is conducted, it is difficult to defeat the enemy character unless an attack is made many times. For this reason, when it is desired to conduct a battle with a strong enemy character, it is necessary to conduct a battle with weak enemy characters many times and improve a level of a player character in order to defeat the formidable enemy such as the boss character. For this reason, since a so-called "level-up" needs to be obtained by repeatedly conducting battles with enemy characters weaker than the formidable enemy, the progress of a game may become monotonous, and fun may be reduced. In addition, when a battle is conducted without increasing a level, a battle is likely to be conducted by simply striking an attack button repeatedly, leading to a monotonous battle.

For example, in a game program discussed in JP 2007-54171 A, a battle with an enemy character can be strategically conducted such that a battle with an enemy character is conducted to cause a hit point of an enemy character to fall within a predetermined hit point range, and then an attack is made, so that the hit point of the enemy character becomes zero (0). However, in order to cause the hit point of the enemy character to fall within the predetermined range, a battle needs to be conducted in a state in which the player character is close in strength to the enemy character to some extent. Moreover, when there is a big difference in strength between the player character and the enemy character, it is very difficult to reduce the hit point of the enemy character to the predetermined range. For this reason, in the game program discussed in JP 2007-54171 A, the player character needs to repeatedly conduct a battle with relatively weak enemy characters and repeatedly increase a level.

SUMMARY OF THE INVENTION

The present invention is directed to provide a game apparatus and a game program, which are capable of more strategically conducting a battle with an enemy character, deepening interest, winning a battle with a formidable enemy even without any level up, and enjoying a game that is rich in strategic feature.

The present invention relates to a game apparatus that causes a game to progress as a player character conducts a virtual battle with an enemy character, comprising: a timer that starts time counting as the player character or the enemy character executes a predetermined action; an attack performer that causes the player character to make an attack on the enemy character; an attack effect generator that generates a predetermined effect as an effect of an attack when a time at which the enemy character is attacked is out of a predetermined time from a start of time counting in a case in which an attack of the player character executed through the attack performer is made on the enemy character; and a special effect generator that generates a special effect different from the predetermined effect as an effect of an attack when a time at which the enemy character is attacked is within a predetermined time from a start of time counting in a case in which an attack of the player character executed through the attack performer is made on the enemy character.

For example, the present invention can be applied to the case in which a situation in which when the enemy character takes a predetermined action such as an attack in a battle between the player character and the enemy character, the enemy character becomes a defenseless pose or state during a very short time period, a chink occurs is assumed.

Here, a time period in which the enemy character becomes a defenseless pose or state corresponds to the predetermined time period. When the player character attacks the enemy character within the predetermined time period, it is possible to generate a special effect different from when the player character attacks the enemy character during a time period other than the predetermined time period. In other words, when an attack of stabbing the chink of the enemy character is made, a battle can be conducted in a condition more advantageous than usual. A technique of stabbing a chink of an enemy and taking advantage during a battle is conducted even in fighting sports or actual battles, and thus as the present invention is applied, an action game or a fighting game based on the real world can be implemented. In addition, the player needs to make an attack at an optimal timing while closely observing an action of enemy character and cause the attack to hit the enemy character, and thus a game can be more strategically enjoyed.

As conditions in which a chink occurs in the enemy character, a chink may occur when the enemy character makes a predetermined attack or when the player character makes a predetermined attack on the enemy character, and a chink may occur when the enemy character is surprised by an action of the player character. As described above, the player character can take an action of causing a chink to occur in the enemy character, and thus a game can be more strategically enjoyed.

In the present invention, it is preferable that the game apparatus further comprising a hit point storage that stores a hit point of the enemy character that changes according to a progress of a game, wherein the special effect generator changes the hit point of the enemy character stored in the hit point storage to zero.

In an action game or a fighting game, there are cases in which the enemy character is beaten only when an attack hits the enemy character twice or more. Typically, a hit point possessed by a character is decided for each character, and the hit point is reduced each time an attack of the player character is successful. Further, when the hit point becomes zero, the enemy character becomes a battle impossible state, and the player character wins a battle.

In the present invention, the enemy character becomes a defenseless pose or state, and when an attack hits the enemy character while a chink is occurring, the hit point becomes zero at once regardless of the magnitude of the remaining hit point of the enemy character. Even in the real world, in fighting sports such as boxing, there is a case in which a counterpart is beaten at a single blow by hitting a punch on a momentary chink, and thus according to the present invention, it is possible to enjoy an action game or a fighting game which is more real and rich in strategic feature.

As described above, since the enemy character can be beaten at a single blow, even when the enemy character is higher in level than the player character, it is possible to stab a momentary chink and win a battle during a very short time, and it is possible to defeat a formidable enemy even without any "level up" according to a player's ability.

In the present invention, it is preferable that the game apparatus further comprising a hit point storage that stores a hit point of the enemy character that changes according to a progress of a game, wherein the attack effect generator reduces the hit point stored in the hit point storage according to a predetermined condition, and the special effect generator reduces the hit point stored in the hit point storage according to a condition different from the predetermined condition.

For example, by hitting an attack on the enemy character while the enemy character becomes a defenseless pose or state and a chink is occurring, it is possible to cause more serious damage than usual to the enemy character. Although the enemy is not beaten by attacking the enemy character with a chink, since serious damage is caused, it is possible to take advantage during a subsequent battle, and a game which is richer in strategic feature can be enjoyed.

In the present invention, it is preferable that the predetermined action is an attack which the enemy character makes on the player character, the game apparatus further comprises an avoidance determiner that determines whether or not the player character has avoided the attack, and the timer starts time counting when the avoidance determiner determines that the player character has avoided the attack.

As described above, when the enemy character attacks the player character, the player character avoids the attack, and thus the attack ends in failure, a chink may occur, and time counting may start. This assumes a so-called counterattack, and since the player character takes a pose of avoiding an attack of the enemy character and continuously making an effective attack, an attack on a defenseless enemy character is powerful.

In the present invention, it is preferable that the game apparatus further comprising a first correspondence relationship storage that stores a correspondence relationship between each action and the predetermined time on a plurality of actions executable by the enemy character, wherein the attack effect generator generates a predetermined effect as an effect of a corresponding attack when an elapsed time from a start of time counting is not within a predetermined time corresponding to the predetermined action in the correspondence relationship stored in the first correspondence relationship storage in a case in which the enemy character is attacked, and the special effect generator generates a special effect as an effect of the attack when an elapsed time from a start of time counting is within a predetermined time corresponding to the predetermined action in the correspondence relationship stored in the first correspondence relationship storage in a case in which the enemy character is attacked.

As the enemy character takes a predetermined action, a chink occurs in the enemy character, and by hitting an attack on the chink, a special effect can be obtained. It is possible to change a time period in which a chink occurs depending on an action taken by the enemy character. For example, a time period of a defenseless state naturally changes depending on whether an attack of the enemy character is an action of stabbing a sword or a slashing action of swing a sword downward, and thus a game which is more real and rich in strategic feature can be enjoyed.

Further, in the present invention, it is preferable that the game apparatus further comprising a second correspondence relationship storage that stores a correspondence relationship between an each action and a special effect in a plurality of actions executable by the enemy character, wherein the special effect generator specifies a special effect corresponding to the predetermined action by the enemy character and generates the special effect, based on the correspondence relationship stored in the second correspondence relationship storage.

According to the present invention, as the enemy character takes a predetermined action, a chink occurs in the enemy character, and by hitting the attack on the chink, a special effect can be obtained. It is possible to change a special effect to be generated according to an action taken by the enemy character. For example, when the enemy character makes a punch by compact movement such as a jab of boxing, a chink to occur is small. Thus, although the player character hits an attack on the chink, it is possible to cause the damage not to be a fatal wound. On the contrary, when a punch is made by large movement such as straight or uppercut of boxing, a chink to occur is large. Thus, it is possible to beat the enemy character at a single blow by an attack of the player character or it is possible to cause serious damage that results in a fatal wound.

In the present invention, it is preferable that a special effect generated by the special effect generator causes the timer to start time counting again.

Further, when the player character attacks the enemy character while a chink is occurring in the enemy character by a certain action of the player character or the enemy character, a special effect is generated. As the special effect, more serious damage than usual may be caused to the enemy character, and when the enemy character loses balance and becomes a defenseless state, a timer may start time counting to cause a chink to occur. Further, it is possible to make a battle strategically progress such that special effects are continuously generated in the above-described way.

In the present invention, it is preferable that the game apparatus further comprising a special effect possibility displayer that displays a special effect possibility display representing that it is possible to generate a special effect by an attack of the player character on the enemy character on a display screen during the predetermined time from the start of time counting by the timer.

Further, when the player character attacks the enemy character while a chink is occurring in the enemy character, a special effect is generated, and when a chink mark representing that the chink is occurring is displayed, the player can recognize the occurrence of a chink.

In the present invention, it is preferable that the game apparatus further comprising an attack alignment setuper that sets a sight of an attack by the player character on the enemy character, wherein the special effect possibility displayer displays a special effect possibility display on the enemy character which is a target of the sight of the attack set by the attack alignment setuper.

Furthermore, it is possible to display a chink mark only on an enemy character which the player character sets a sight of an attack on and locks on.

The present invention relates to a game program that causes a computer device to execute a game that progresses as a player character conducts a virtual battle with an enemy character, the game program causing the computer device to function as: a timer that starts time counting as the player character or the enemy character executes a predetermined action; an attack performer that causes the player character to make an attack on the enemy character; an attack effect generator that generates a predetermined effect as an effect of an attack when a time at which the enemy character is attacked is out of a predetermined time from a start of time counting in a case in which an attack of the player character executed through the attack performer is made on the enemy character; and a special effect generator that generates a special effect different from the predetermined effect as an effect of an attack when a time at which the enemy character is attacked is within a predetermined time from a start of time counting in a case in which an attack of the player character executed through the attack performer is made on the enemy character.

The present invention also relates to a game progress method for causing a computer device to execute a game that progresses as a player character conducts a virtual battle with an enemy character, the method causing the computer device to execute: a time counting that starts time counting as the player character or the enemy character executes a predetermined action; an attack performing that causes the player character to make an attack on the enemy character; an attack effect generating that generates a predetermined effect as an effect of an attack when a time at which the enemy character is attacked is out of a predetermined time from a start of time counting in a case in which an attack of the player character executed through the causing of the player character to make an attack is made on the enemy character; and a special effect generating that generates a special effect different from the predetermined effect as an effect of an attack when a time at which the enemy character is attacked is within a predetermined time from a start of time counting in a case in which an attack of the player character executed through the causing of the player character to make an attack is made on the enemy character.

DETAILED DESCRIPTION OF EMBODIMENTS

Figure 1:
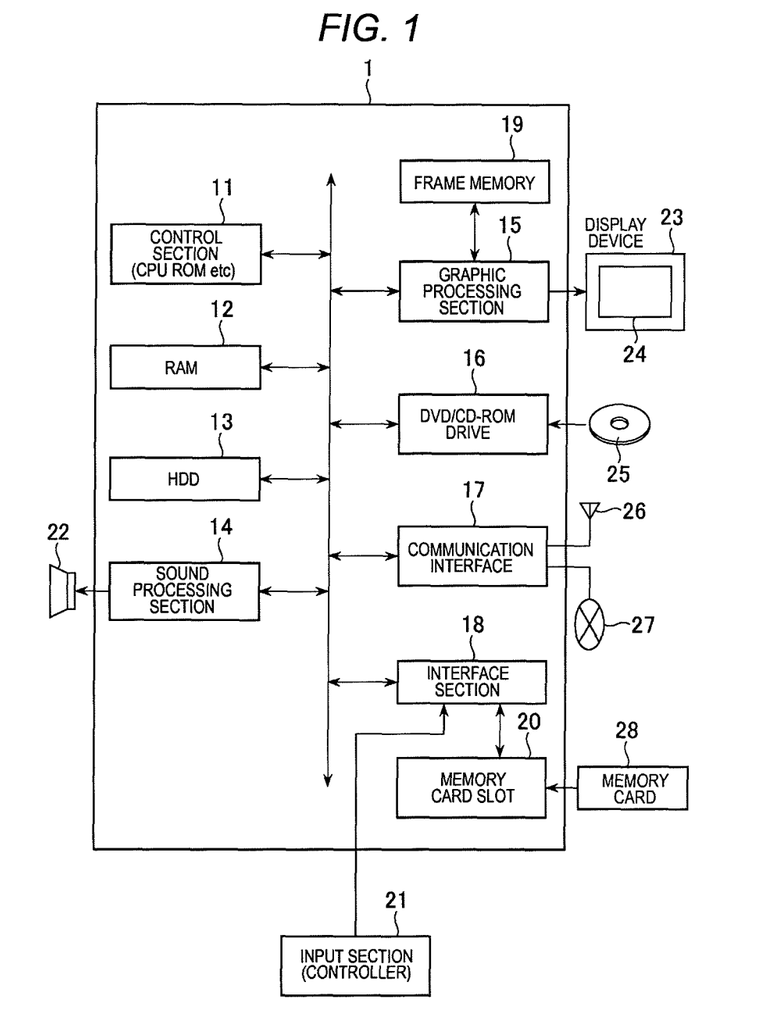
FIG. 1 is a block diagram illustrating a configuration of a game apparatus according to an embodiment of the present invention.

Hereinafter, exemplary embodiments of the present invention will be described with reference to the accompanying drawings. The present embodiment will be descried in connection with an example in which a text input device of the invention is applied to a game apparatus. FIG. 1 is a block diagram illustrating a configuration of a text input device (game apparatus) according to an embodiment of the invention. The game apparatus is configured centering on a device body 1. The device body 1 includes a control section 11, a random access memory (RAM) 12, a hard disk drive (HDD) 13, a sound processing section 14, a graphic processing section 15, a DVD/CD-ROM drive 16, a communication interface 17, and an interface section 18, which are connected to one another via an internal bus.

The control section 11 includes a central processing unit (CPU) and a read only memory (ROM). The control section 11 executes a program stored in the HDD 13 or a storage medium 25 and controls the device body 1. Further, the control section 11 includes an internal timer. The RAM 12 serves as a work area of the control section 11. The HDD 13 serves as a storage region for storing a program and data.

The storage medium 25 in which a game program is stored such as a digital versatile disk-read only memory (DVD-ROM) or a compact disk-read only memory (CD-ROM) can be placed on the DVD/CD-ROM drive 16. The storage medium 25 stores a program and data necessary to play a game through a video game apparatus, and the DVD/CD-ROM drive 16 reads program and data, and loads the program and the data into the RAM 12.

The control section 11 reads data necessary for the progress of a game from the RAM 12, and processes the read data. Necessary data is loaded from the storage medium 25 into the RAM 12 according to a progress status of a game. After processing the program and data loaded into the RAM 12, the control section 11 outputs a sound output instruction to the sound processing section 14, and outputs a rendering command to the graphic processing section 15. The sound processing section 14 is connected with a sound output device 22 serving as a speaker. Here, when the control section 11 outputs the sound output instruction to the sound processing section 14, the sound processing section 14 outputs a sound signal to the sound output device 22.

The graphic processing section 15 is connected with a display device 23 including a display screen 24. Here, when the rendering command is output from the control section 11, the graphic processing section 15 develops an image onto a frame memory (a frame buffer) 19, and outputs a video signal causing an image to be displayed on the display screen 24 of the display device 23. A duration of one frame of an image included in the video signal output from the graphic processing section 15 is, for example, one thirtieth (1/30) seconds. The graphic processing section 15 executes rendering of one image in units of frames (unit of one thirtieth (1/30) seconds).

The interface section 18 is connected with an input section (controller) 21 and a memory card slot 20. The input section 21 includes a directional key and a plurality of operation buttons, and a text is input by operating the directional key and the buttons. Input information input through the input section 21 by the player is stored in the RAM 12, and the control section 11 executes various kinds of calculation processes based on the input information.

The communication interface 17 is connected with a communication network 27 in a wireless or wired manner. In addition, the communication interface 17 can perform wireless communication with another game apparatus through a communication unit having an antenna 26.

Figure 2:
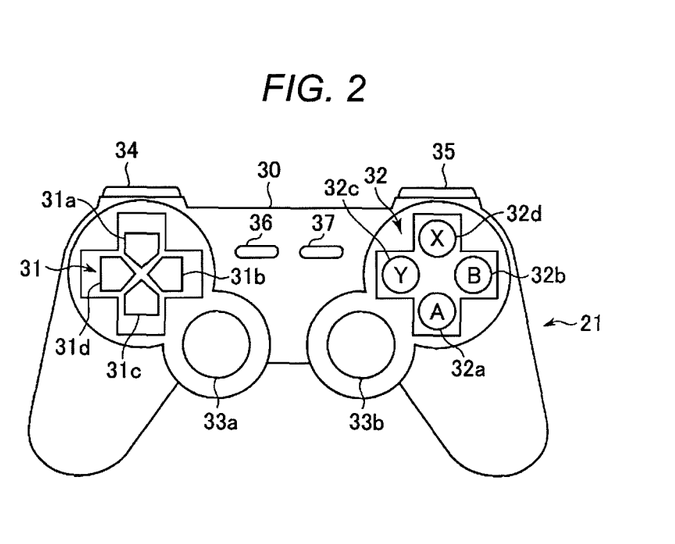
FIG. 2 is a diagram illustrating an example of an input section of a game apparatus according to an embodiment of the present invention.

FIG. 2 is a diagram illustrating an example of the input section 21 according to an embodiment of the invention. A cross key 31 is disposed on the left side at the front of an input section body 30, and a button group 32 is disposed on the right side. The cross key 31 includes an up key 31a, a right key 31b, a down key 31c, and a left key 31d, and the button group 32 includes an A button 32a, a B button 32b, a Y button 32c, and an X button 32d. Further, a select button 36 and a start button 37 are disposed on a central portion of the input section 21. In addition, a plurality of buttons such as an L button 34 and an R button 35 are disposed on a lateral portion of the input section 21. Furthermore, joysticks 33a and 33b are disposed on a lower right side of the cross key 31 and a lower left side of the button group 32.

Here, when pressing force is applied to each button, a corresponding switch is turned on. A detection signal corresponding to an on/off operation of the switch is generated in the input section 21. Further, a detection signal corresponding to a falling direction of the joystick 33 is generated in the input section 21. The detection signal of the switch system generated in the input section 21 is supplied to the interface section 18, and serves as detection information representing a turned-on button. In addition, in case of the joystick 33, the detection signal of the joystick system serves as detection information representing a status of the joystick 33. An operation instruction made on the input section 21 by the player in the above-described way is supplied to the device body 1.

For example, when the button group 32 is pushed down, the player character executes various actions such as a hitting attack by a bare hand or a weapon or a use of attack magic, recovery magic, or an item. Further, when the cross key 31 is pushed down or when the joystick 33 is inclined, the player character moves, or the position of a virtual camera in the virtual space is changed.

Meanwhile, the invention relates to a game in which a virtual battle is conducted between the player character and the enemy character. As the player character or the enemy character executes a predetermined action, the enemy character shows a chink, and when the player character attacks the enemy character while there is a chink, a special effect to conduct a battle with advantage is obtained. Here, the player character refers to not only a character which the player can operate through an input to the input section 21 but also a character that acts as an ally of a character operated by the player, and includes a non-player character controlled by artificial intelligence (AI) according to a course of action set by the player. Meanwhile, the enemy character refers to not only a character that is controlled by AI and acts as the enemy of the player character but also a character operated by a player other than the player when two or more persons play a game by communication.

Figure 3:
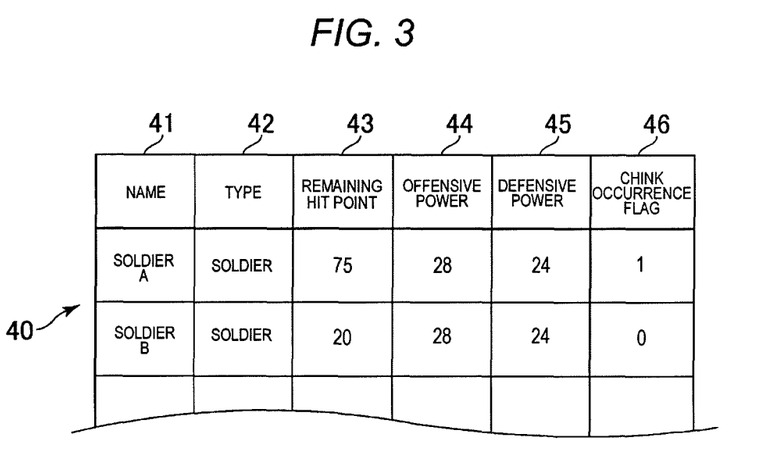
FIG. 3 is a diagram illustrating an example of a character management table according to an embodiment of the present invention.

FIG. 3 is a diagram illustrating an enemy character management table according to an embodiment of the invention. The enemy character management table 40 includes a name 41, a type 42, a remaining hit point 43, an offensive power 44, a defensive power 45, and a chink occurrence flag 46 set thereto. The enemy character management table 40 is used to manage all enemy characters appearing on a field map, and set to the RAM 12. Further, the items from the type 42 to the chink occurrence flag 46 are stored in association with the name 41.

The name 41 is set for each enemy character, and the type 42 is used to specify the type of enemy character such as "soldier," "dragon," and "dark knight." Display data, a status such as offensive power or defensive power, a possible action, and the like are decided for each type 42 of the enemy character. The remaining hit point 43 refers to a remaining hit point for the enemy character, and when this value becomes zero (0), the enemy character enters a battle impossible state. The enemy character in the battle impossible state is not displayed on the display screen 24.

The offensive power 44 represents the strength of attack possessed by the enemy character, and as this value increases, damage of the player character attacked by the enemy character increases. Meanwhile, the defensive power 45 represents the magnitude of defensive power possessed by the enemy character, and as this value increases, damage (a value by which the hit point is reduced) of the enemy character at the time of an attack from the player character is reduced. Here, when a chink does not occur in the enemy character, typically, the magnitude of damage of the enemy character is decided based on the offensive power of the player character and the defensive power of the enemy character.

The chink occurrence flag 46 is set to represent a chink occurrence state in which the enemy character shows a chink when the player character or the enemy character makes a predetermined action such as an attack. The chink occurrence flag 46 is set during a chink occurrence time period which will be described later, and after a time elapses, a setting of the chink occurrence flag 46 is released during a time period other than the chink occurrence time period. Here, in a state in which the chink occurrence flag 46 remains set, when the player character hits an attack on the enemy character, the remaining hit point of the attacked enemy character becomes zero (0), or a special effect by which damage, larger than typical damage, which is decided based on the values of the offensive power of the player character and the defensive power of the enemy character is generated.

Figure 4:
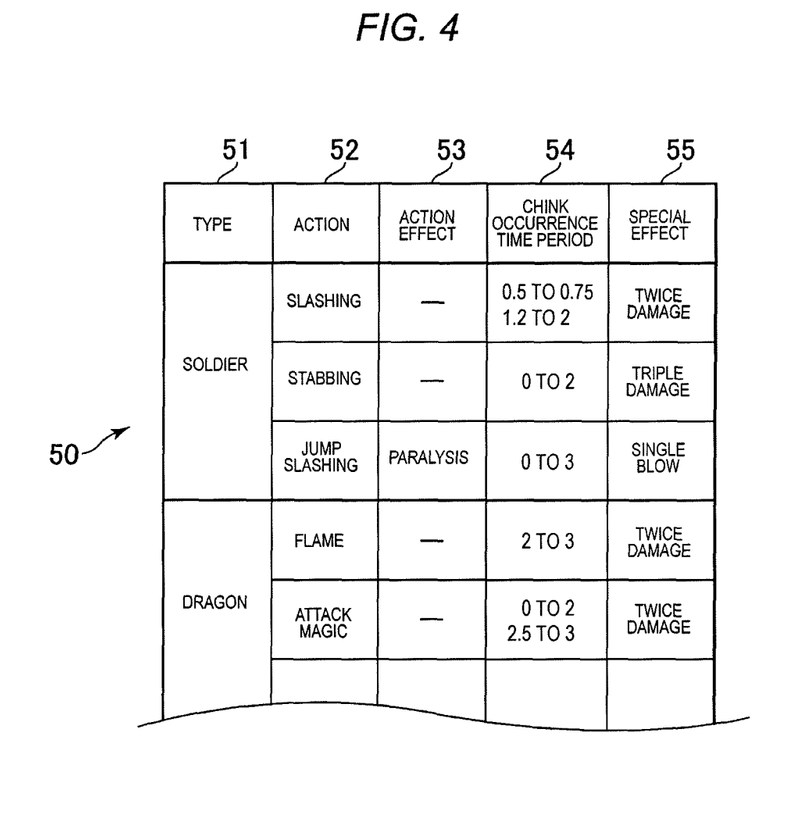
FIG. 4 is a diagram illustrating an example of an action table according to an embodiment of the present invention.

FIG. 4 is a diagram illustrating an example of an action table according to an embodiment of the invention. The action table 50 is used to define a relationship among an action by the enemy character, the chink occurrence time period, and the special effect, and set to the RAM 12. The action table 50 stores a type 51, an action 52, an action effect 53, a chink occurrence time period 54, and a special effect 55.

The type 51 represents the type of enemy character, similarly to the type 42 of the enemy character management table 40. The enemy character has a plurality of attack patterns, and the actions 52 related to a plurality of attacks are stored in advance for each type 51. In addition, the action effect 53, the chink occurrence time period 54, and the special effect 55 are stored in association with the action 52.

The action 52 includes not only a hitting-based attack using an equipment item such as a sword or an ax or a bare hand but also a use of magic such as attack magic or recovery magic. In addition, in the hitting-based attack, a different chink occurrence time period 54 or a different special effect 55 can be set according to the type of attack such as "stabbing" representing an action of stabbing with a sword or a spear or "slashing" representing an action of slashing a sword. In the use of magic, a time period of chanting the magic or an action at the time of chanting differs according to the type of magic, and a different chink occurrence time period 54 or a different special effect 55 can be set. The action 52 is not limited to the example of using an attack or a magic, and may include a use of an item. Furthermore, in the action 52, a chink is shown even when a character jumps down from a high place and lands on the ground, and an action such as "jumping down" can invoke a chink occurrence time period.

The action effect 53 represents an effect occurring when the action 52 by the enemy character is successful, that is, an effect when the enemy character hits an attack on the player character. The action effect 53 may cause only damage by typical hitting or may cause the player character to enter an abnormal state such as paralysis or petrifaction.

The chink occurrence time period 54 represents a time zone (timing) in which a chink occurs when a start time or an end time of the action 52 of the enemy character is set to zero (0), and typically has a predetermined width. For example, when "0.5 seconds to 0.75 seconds" or "1.2 seconds to 2 seconds" are stored as the chink occurrence time period 54, a chink occurs between 0.5 seconds and 0.75 seconds or between 1.2 seconds and 2 seconds from the start of the action 52 of the enemy character, and the chink occurrence flag 46 of the enemy character management table 40 is set. Further, the chink occurrence time period 54 may not be set depending on the action 52, and a setting may be made such that no chink occurs at all.

The chink occurrence time period 54 may be set on a plurality of time zones such as after the start, in the middle, and after the end of the action 52. Therefore, a chink may occur not only immediately after an attack by the enemy character ends but also immediately after the start or in the middle of an attack operation. For example, in the case in which the enemy character holds a sword overhead and then swings a sword downward with both hands, a chink occurs when a sword is held overhead and when a sword is swung down. Further, when the enemy character attacks the player character using attack magic, a chink occurs when magic is chanted and when magic is completely made. In the actual world, since powerful attack is likely to invoke a chink, as the power of the action effect 53 increases, the chink occurrence time period 54 increases, and the special effect is set to a large effect.

The special effect 55 stores an effect occurring when the player character hits an attack on the enemy character in which a chink occurs during the chink occurrence time period 54 in advance. For example, when the hit point of the enemy character becomes zero (0), it is made possible to beat the enemy character at a single blow. It is made possible to cause serious damage which is twice or three times as large as damage by typical attack made during a time period other than the chink occurrence time period 54 to the enemy character. In addition, it is made possible not only to cause serious damage to the enemy character but also to cause the balance of the enemy character to be lost or to paralyze movement. Furthermore, it is made possible to invoke a chink in the enemy character again. In this case, an animation representing that the balance of the enemy character is lost or that the enemy character is paralyzed and thus difficult to move is displayed on the display screen. Besides, an effect causing the enemy character to become an abnormal state such as an effect by which the enemy character enters a sleep state or a toxic state or an effect by which the offensive power, the defensive power, or the speed of the enemy character is reduced may be given as the special effect 55. Further, in the game such as the action RPG, when a boss character is beaten at a single blow in the initial stage of a battle with a boss character that plays an important role in the progress of a story of a game, fun may be reduced to half. For this reason, for example, content of the special effect 55 may be configured to change according to the remaining hit point 43 of the boss character. For example, although the special effect 55 occurs in the initial stage of a battle, relatively serious damage is caused, and when the remaining hit point 43 is a predetermined value or less, content of the special effect 55 changes, and the player character can beat the boss character at a single blow through the same attack.

In the special effect 55, an effect to be generated differs according to the action 52 of the enemy character, but an effect to be generated can be changed according to an attack method of the player character as well as the action 52 of the enemy character. For example, when the player character hits an attack on the enemy character by hitting during the chink occurrence time period 54, the enemy character is beaten at a single blow, but when the enemy character is hit by an attack by magic, the enemy character can be seriously damaged.

Figure 5:
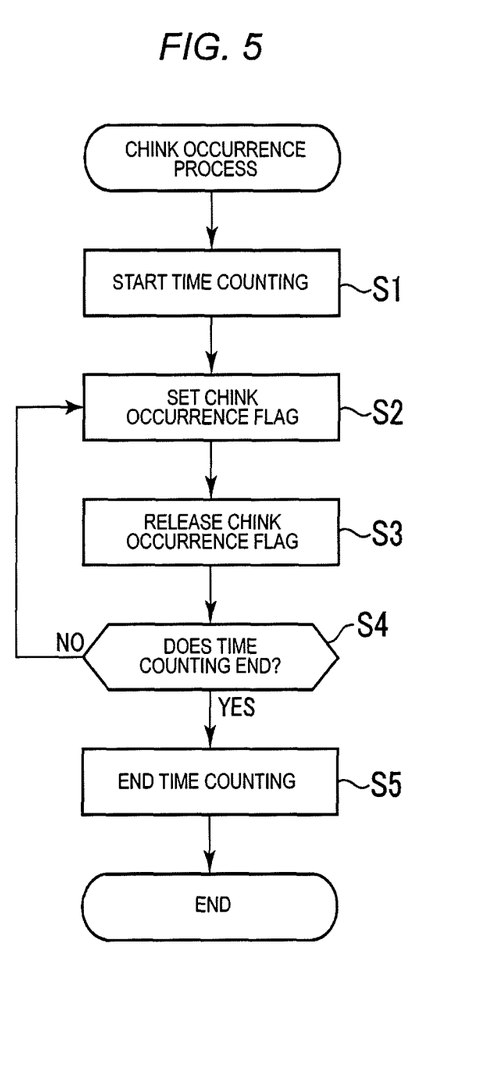
FIG. 5 is a diagram illustrating a flowchart of a chink occurrence process according to an embodiment of the present invention.

Next, a chink occurrence process according to an embodiment of the invention will be described. FIG. 5 is a diagram illustrating a flowchart of a chink occurrence process according to an embodiment of the invention. First, a time is counted when an action (an attack operation on the player character) by the enemy character starts (step S1). Here, when a time elapsed after a time is counted corresponds to the chink occurrence time period 54 stored in the action table 50, the chink occurrence flag 46 of the enemy character management table 40 is set (step S2).

Although the chink occurrence flag 46 is set, when a time elapsed after a time is counted does not correspond to the chink occurrence time period 54 stored in the action table 50, the chink occurrence flag 46 of the enemy character management table 40 is released (step S3).

Here, when the chink occurrence flag 46 is released in step S3, it is determined whether or not time counting has ended (step S4). Although the setting of the chink occurrence flag 46 is released in step S3, when a plurality of chink occurrence time periods 54 are set on one action 52, a time is continuously counted until the last chink occurrence time period 54 corresponding to the action 52 ends. Here, when the last chink occurrence time period 54 related to the action 52 has ended and the setting of the chink occurrence flag 46 has been released (YES in step S4), time counting ends (step S5), and then a series of processes end. However, when a time is continuously counted (NO in step S4), the chink occurrence flag 46 is set again as a time elapses (step S2).

Figure 6:
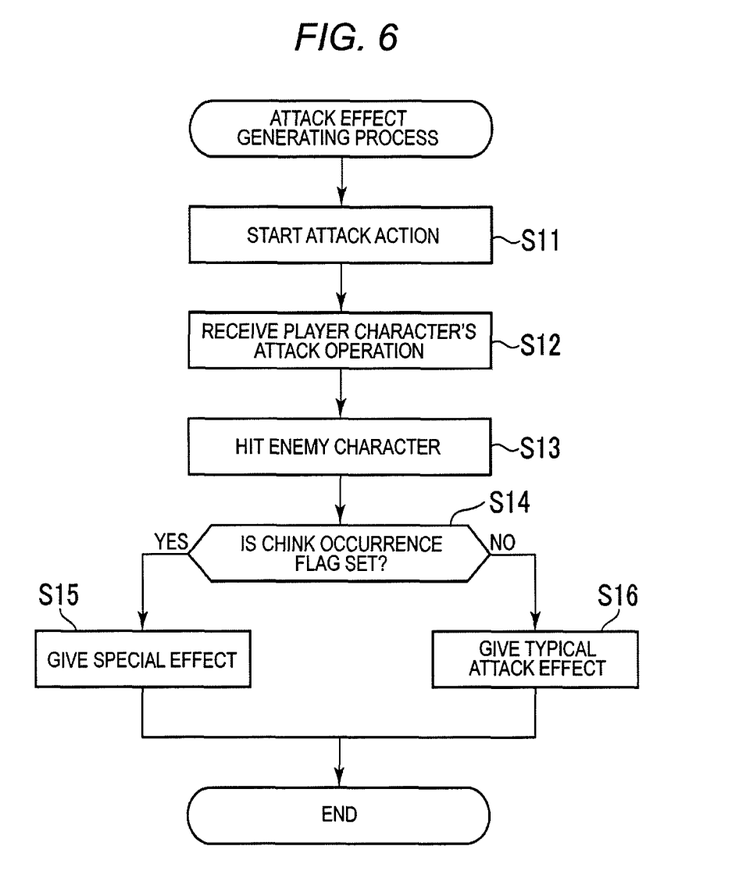
FIG. 6 is a diagram illustrating an example of a flowchart of an attack effect generating process according to an embodiment of the present invention.

Next, an attack effect generating process according to an embodiment of the invention will be described. FIG. 6 is a diagram illustrating an example of a flowchart of an attack effect generating process according to an embodiment of the invention.

First, an action (for example, an attack on the player character) by the enemy character starts (step S11). For example, an operation of holding a sword overhead and then swinging a sword toward the player character with both hands is given to the enemy character, and the operation of the enemy character can be checked through the display screen 24. Further, at the same time when an attack operation of the enemy character starts in step S11, time counting in step S1 starts, and a series of chink occurrence processes from step S1 to step S4 are executed.

Next, as the player operates the input section 21, an attack operation of the player character on the enemy character is received (step S12). Here, when the attack operation is received and the player character hits an attack on the enemy character (step S13), it is determined whether or not the chink occurrence flag 43 remains set on the enemy character hit by the attack with reference to the enemy character management table 40 (step S14). The determination on whether or not the player character in step S13 has hit an attack on the enemy character is executed by a collision determination process.

Here, when the chink occurrence flag 43 remains set on the attacked enemy character (YES in step S14), the special effect 55 is generated based on the action table 50 (step S15). However, when the chink occurrence flag 43 does not remain set on the attacked enemy character (NO in step S14), a typical attack effect is generated (step S16). Here, when the remaining hit point 43 of the enemy character is "zero (0)" at a point in time of step S15 or S16, the battle ends, but when the remaining hit point 43 is not "zero (0)," the battle is continued, and the process of steps S11 to S16 is continuously performed.

Figure 7:
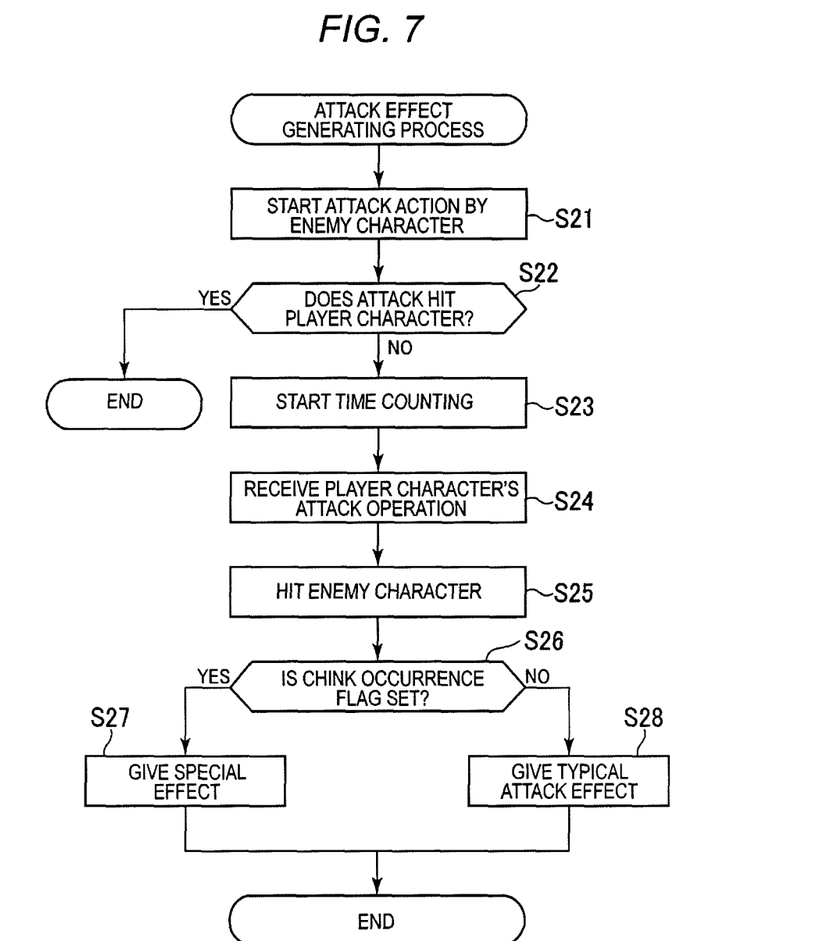
FIG. 7 is a diagram illustrating an example of a flowchart of an attack effect generating process according to an embodiment of the present invention.

In the attack effect generating process illustrated in FIG. 6, when the enemy character makes an attack, the chink occurrence process starts, and a chink occurs in the enemy character. However, when the player character avoids the attack made by the enemy character, the chink occurrence time period may start. FIG. 7 is a diagram illustrating an example of a flowchart of the attack effect generating process in this case.

First, an attack action of the enemy character on the player character starts (step S21). For example, an operation of holding a sword, overhead and then swinging a sword toward the player character with both hands is given to the enemy character. Here, when the enemy character hits an attack on the player character at a point in time when the operation ends (NO in step S22), the player character is damaged, and a series of processes end. The determination on whether or not the enemy character has hit an attack on the player character is performed by the collision determination process.

However, when the player character moves his/her position and avoids the attack of the enemy character or when the player character takes a defensive pose and defends the attack of the enemy character (YES in step S22), a chink occurs in the enemy character, and time counting starts (step S23). At this time, a chink mark is displayed on the display screen 24 to overlap display data of the enemy character.

Next, as the player operates the input section 21, an attack operation of the player character on the enemy character is received (step S24). Here, when the attack operation is received and the player character hits an attack on the enemy character (step S25), it is determined whether or not the chink occurrence flag 43 remains set on the enemy character hit by the attack with reference to the enemy character management table 40 (step S26).

Here, when the chink occurrence flag 43 remains set on the attacked enemy character (YES in step S26), the special effect 55 is generated based on the action table 50 (step S27). However, when the chink occurrence flag 43 does not remain set on the attacked enemy character (NO in step S26), a typical attack effect is generated (step S28). Here, when the remaining hit point 43 of the enemy character is "zero (0)" at a point in time of step S27 or S28, the battle ends, but when the remaining hit point 43 is not "zero (0)," the battle is continued, and the process of steps S21 to S28 is continuously performed.

In step S22, it is determined whether or not the player character has avoided the attack based on whether or not an attack has hit the player character when an attack action by the enemy character ends. However, when an attack is not made on the player character although a predetermined time (for example, several seconds) elapses from the start of the attack action by the enemy character, in step S22, it may be determined that the attack on the enemy character has been avoided.

Figure 8A:
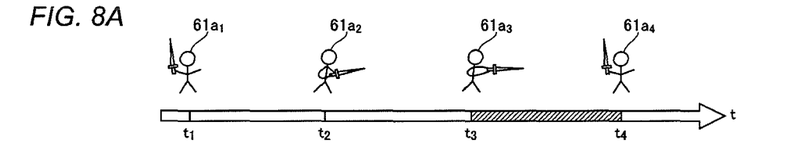
FIGS. 8A and 8B are diagrams illustrating a correspondence relationship between an action of an enemy character and a chink occurrence time period according to an embodiment of the present invention.
Figure 8B:
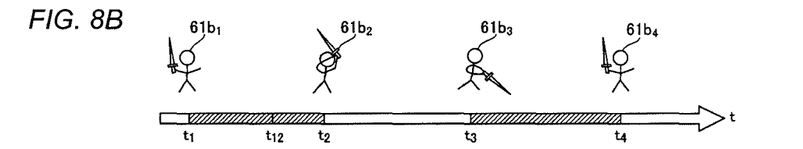

FIGS. 8A and 8B are diagrams illustrating a correspondence relationship between an action of the enemy character and the chink occurrence time period according to an embodiment of the invention. In FIGS. 8A and 8B, an arrow displayed below the enemy character 61 represents the lapse of time, and as it proceeds to the right side, a time elapses. In FIG. 8A, an enemy character $61a_1$ makes a "stabbing" action of stabbing a sword forward. In this case, time counting starts at the same time when the enemy character $61a_1$ starts an action of stabbing a sword. During an action of stabbing a sword forward, a chink does not occur in an enemy character $61a_2$. A chink occurs when an enemy character $61a_3$ has completely stabbed a sword forward. Then, when an enemy character $61a_4$ recovers an original upright posture, the occurred chink is released. In this case, the chink occurrence time period 54 is set between a time $t_3$ and a time $t_4$, and during this time period, the display screen 24 displays a chink occurrence mark representing that a chink has occurred to overlap the display data of the enemy character 61a.

Meanwhile, in FIG. 8B, an enemy character 61b makes a "slashing" action of holding a sword overhead and slashing a sword downward. In this case, time counting starts at the same time when the enemy character $61b_1$ starts an action of holding a sword overhead. At the same time when an action of holding a sword overhead starts, a chink occurs in the enemy character $61b_1$, but an enemy character $61b_2$ raises a sword up to the highest position, the occurred chink is released. A chink occurs again when the enemy character $61b_3$ swings the raised sword downward, but when an enemy character $61b_4$ recovers an original upright posture, the occurred chink is released. In this case, the chink occurrence time period 54 is set between a time $t_1$ and a time $t_2$ and between a time $t_3$ and a time $t_4$, and during this time period, the display screen 24 displays a chink occurrence mark representing that a chink has occurred to overlap the display data of the enemy character 61b.

As described above, in FIG. 8B, the chink occurrence time period 54 is present in a plurality of time zones such as the time period $t_1$ to $t_2$ and the time period $t_3$ to $t_4$. However, for example, the time period $t_1$ to $t_2$ and the time period $t_3$ to $t_4$ may differ in the size of a chink to occur from each other, that is, may differ in the special effect to occur from each other. In other words, when the player character hits an attack on the enemy character during the time period $t_1$ to $t_2$, the hit point of the enemy character becomes zero (0), and thus the enemy character can be beaten at a single blow, whereas when the player character hits an attack on the enemy character during the time period $t_3$ to $t_4$, more serious damage than typical damage can be caused to the enemy character. As will be described later, the color or the shape of the chink mark can be changed according to the content of the special effect generated when the mark is being generated. However, in this case, the color or the shape of the chink mark displayed during the time period $t_1$ to $t_2$ is different from the color or the shape of the chink mark displayed during the time period $t_3$ to $t_4$.

Further, it is possible to change the special effect generated when the player character hits an attack on the enemy character in midstream even in the same consecutive one time zone. For example, as illustrated in FIG. 8B, the time period $t_1$ to $t_2$ includes two time zones of a time period $t_1$ to $t_{12}$ and a time period $t_{12}$ to $t_2$. The two time zones may differ in the size of a chink to occur, that is, in the special effect to be generated. In other words, since an occurred chink is large while the enemy character is taking an action, when the player character hits an attack on the enemy character, the enemy character can be beaten at a single blow. However, thereafter, the chink of the enemy character is relatively small, and thus it is difficult to beat the enemy character at a single blow although the player character hits an attack on the enemy character, and it is merely possible to cause relatively serious damage to the enemy character. In this case, the color or the shape of the chink mark displayed to overlap the display data of the enemy character can be changed in midstream.

Figure 9A:
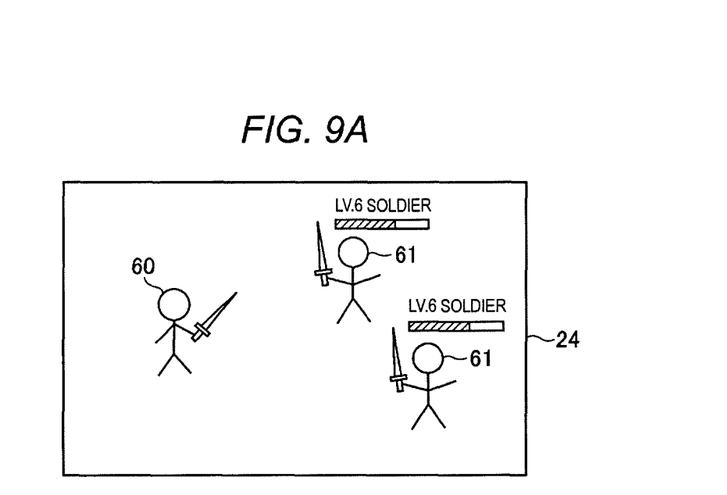
FIGS. 9A and 9B illustrate an example of a display screen according to an embodiment of the present invention.
Figure 9B:
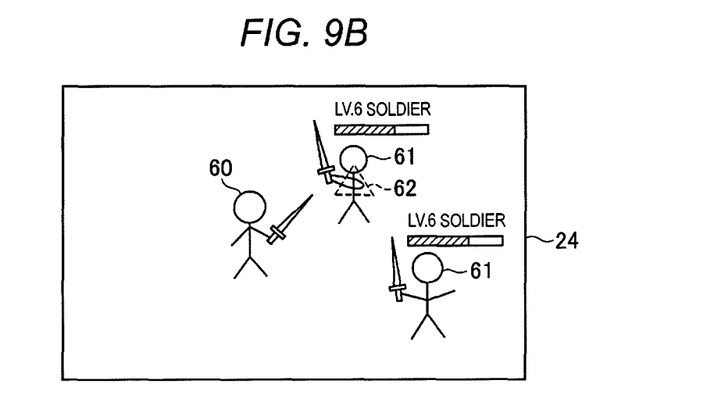

FIGS. 9A and 9B illustrate an example of a display screen according to an embodiment of the invention. The player can operate the input section 21 to select one enemy character 61 to lock (adjust the sight) on as an attack target from among a plurality of enemy characters 61. In a state of FIG. 9A, a chink does not occur yet. Here, when the player character 60 locks on the enemy character 61, the player character 60 can attack the enemy character 61. When the enemy character 61 makes an attack, a chink occurs in the enemy character 61 at a predetermined timing, and a chink mark 62 (which is indicated by a triangle of a dashed line in FIG. 9B, but the shape is not particularly limited) is displayed as illustrated in FIG. 9B. The chink mark 62 is displayed only on the enemy character 61 on which the player character locks.

According to the special effect generated when the player character makes an attack at the time of generation of the chink mark 62, it is possible to change the color or the shape of the chink mark 62. The player can recognize content of the special effect through the color or the shape of the chink mark 62, and in some cases, the player may decide not to attack the enemy character 61 at that timing although the chink mark 62 remains generated. That is, the player can make a strategic determination. For example, when a special attack beats the enemy character 61 at a single blow, the chink mark 62 may be displayed in red, and when a special attack causes serious damage, the chink mark 62 may be displayed in yellow.

In the above-described embodiment, the invention is applied to such a case that a single person mainly plays a game through a stationary game apparatus or a portable game apparatus. However, the invention can be applied even to an on-line game executed through a server apparatus connected with a plurality of the game apparatuses. In this case, an input operation input when the player operates the input section in the game apparatus is transmitted to the server apparatus, and based on the input operation from each of a plurality of the game apparatuses, a game program is executed to control the progress of a game. In addition, the invention can be applied to a case in which a game progresses through a plurality of portable game apparatuses which are connected to one another by wireless communication without intervention of the server apparatus.

As described above, when a plurality of players operate their game apparatuses and cause a game to progress at the same time, a setting can be made to give a special effect by which the player character as well as the non-player character controlled by AI is beaten at a single blow by an attack from another player character or is seriously damaged.

For example, in the case in which a player character A plays a game against a player character B, when the player character A takes an attack action, a chink occurs in the player character A. In this case, a chink mark representing that the player character A can be beaten at a single blow is displayed on the display screen of the game apparatus by which the player character B is operated until a predetermined time elapses after a chink occurs. Here, when the player character B hits an attack on the player character A at a timing at which the chink mark is being displayed on the player character A, the remaining hit point of the player character A becomes "zero (0)" regardless of the remaining magnitude of the hit point of the player character A, the defensive power of the player character A, and the offensive power of the player character B, and the player character A enters the battle impossible state.

In the above-described embodiment, when the enemy character starts an action such as an attack, a chink occurs at a predetermined timing, or when the player character avoids an attack of the enemy character, a chink occurs. However, a method of intentionally causing a chink to occur in the enemy character through the player character's behavior as described below can be employed as another method of causing a chink to occur.

As a method of causing a chink to occur in the enemy character, when the enemy character makes an attack on the player character and the player character avoids the attack, a chink may occur when the player character hits an attack on the enemy character. Further, it is possible to cause a chink to occur using a cooperation technique or a continuous technique by the player character and another character (including the player character and a non-player character) or a special ability acquired as the player character accumulates experience. In this case, it may be made a condition that the attack of the enemy character is hit back by the cooperation technique or the special ability.

The above-described embodiment has been described in connection with the example in which the present invention is applied to an action game or a fighting game including an action RPG. However, the present invention is not particularly limited to a game of this genre and can be applied even to a game of a different genre such as a shooting game or a race game.

What is claimed is:

1. A game system that causes a game to progress as a player character conducts a virtual battle with an enemy character, the game system comprising:
   a server apparatus; and
   a plurality of game apparatuses which are interconnected via the server apparatus, the server apparatus receiving input operation from each of the plurality of game apparatuses, the game progressing based on the input operation from each of the plurality of game apparatuses,
   wherein a game apparatus of the plurality of game apparatuses controls the first player character and includes:
      a controller;
      a processor;
      a correspondence relationship storage that stores a correspondence relationship between a plurality of actions and a plurality of time zones, the plurality of actions including a predetermined action that is stored in correspondence with a plurality of predetermined time zones in the correspondence relationship storage; and a memory storing instructions that, when executed by the processor, cause the processor to perform operations including:
    starting time counting, by a timer, as the enemy character executes the predetermined action of the plurality of actions;
    causing the player character to make an attack on the enemy character when an attack operation of the player character on the enemy character is received by the controller;
    generating a predetermined effect when a time at which the player character hits the attack on the enemy character is out of all of the plurality of predetermined time zones from a start of the time counting;
    generating a special effect different from the predetermined effect when the time at which the player character hits the attack on the enemy character is within one of the plurality of predetermined time zones from the start of the time counting; and
    displaying a special effect possibility display on a display screen during each of the plurality of predetermined time zones to represent that it is possible to generate the special effect by the attack of the player character on the enemy character,
wherein different special effects correspond to the plurality of predetermined time zones, the special effect being selected from the different special effects in correspondence with the time at which the player character hits the attack on the enemy character.

2. The game system according to claim 1,
wherein a hit point of the enemy character changes according to the progress of the game, and
the hit point of the enemy character changes to zero as one of the different special effects.

3. The game system according to claim 1,
wherein a hit point of the enemy character changes according to the progress of the game,
the hit point of the enemy character is reduced according to a predetermined condition, and
the hit point is reduced according to a special condition different from the predetermined condition when the time at which the player character hits the attack on the enemy character is within any of the plurality of predetermined time zones from the start of the time counting.

4. The game system according to claim 1,
wherein the predetermined action is an enemy attack which the enemy character makes on the player character,
the operations further include determining whether the player character avoids the enemy attack, and
the time counting is started when the player character avoids the enemy attack.

5. The game system according to claim 1, wherein the game apparatus further includes:
    a second correspondence relationship storage that stores a second correspondence relationship between the plurality of actions and a plurality of special effects,
wherein the processor generates the special effect based on the second correspondence relationship stored in the second correspondence relationship storage.

6. The game system according to claim 1, wherein the game apparatus further includes:
    a graphics processor that displays the special effect possibility display representing the possibility to generate the special effect by the attack of the player character on the enemy character on the display screen.

7. The game system according to claim 6,
wherein the operations further include setting a sight of the attack by the player character on the enemy character, and
the graphics processor displays the special effect possibility display on the enemy character which is a target of the sight of the attack.

8. The game system according to claim 1,
wherein one of the different special effects causes the timer to start the time counting again.

9. The game system according to claim 1, wherein the plurality of predetermined time zones are inconsecutive in the time counting.

10. The game system according to claim 1, wherein the plurality of predetermined time zones have different durations.

11. The game system according to claim 1, wherein
the predetermined action includes a powerful attack executed by the enemy character,
a duration of the predetermined time zone increases in accordance with a power of the powerful attack executed by the enemy character, and
a power of the special effect increases in accordance with the power of the powerful attack executed by the enemy character.

12. The game system according to claim 1, wherein the plurality of predetermined time zones have different durations, are inconsecutive, and begin a predetermined time period after the start of the time counting.

13. A non-transitory computer-readable medium including a game program that causes a game to progress as a player character conducts a virtual battle with an enemy character, the game being executed by a plurality of game apparatuses which are interconnected via a server apparatus, the server apparatus receiving input operations from each of the plurality of game apparatuses, the game progressing based on the input operations from each of the plurality of game apparatuses, the game program causing a game apparatus of the plurality of game apparatuses that controls the first player character to execute:
    storing, in a correspondence relationship storage, a correspondence relationship between a plurality of actions and a plurality of time zones, the plurality of actions including a predetermined action that is stored in correspondence with a plurality of predetermined time zones in the correspondence relationship storage,
    starting, by a timer, time counting as the enemy character executes the predetermined action of the plurality of actions;
    causing the player character to make an attack on the enemy character when an attack operation of the player character on the enemy character is received by a controller;
    generating a predetermined effect when a time at which the player character hits the attack on the enemy character is out of all of the plurality of predetermined time zones from a start of the time counting; and
    generating a special effect different from the predetermined effect when the time at which the player character hits the attack on the enemy character is within any one of the plurality of predetermined time zones from the start of the time counting, and
    displaying a special effect possibility display on a display screen during each of the plurality of predetermined time zones to represent that it is possible to generate the special effect by the attack of the player character on the enemy character, wherein different special effects correspond to the plurality of predetermined time zones, the special effect being selected from the different special effects in correspondence with the time at which the player character hits the attack on the enemy character.

14. The non-transitory computer-readable medium according to claim 13, wherein the plurality of predetermined time zones are inconsecutive in the time counting.

15. The non-transitory computer-readable medium according to claim 13, wherein the plurality of predetermined time zones have different durations.

16. The non-transitory computer-readable medium according to claim 13, wherein the plurality of predetermined time zones have different durations, are inconsecutive, and begin a predetermined time period after the start of the time counting.

17. A game progress method for causing a game to progress as a player character conducts a virtual battle with an enemy character, the game being executed by a plurality of game apparatuses which are interconnected via a server apparatus, the server apparatus receiving input operations from each of the plurality of game apparatuses, the game progressing based on the input operations from each of the plurality of game apparatuses, the method causing a game apparatus of the plurality of game apparatuses that controls the first player character to execute:

storing, in a correspondence relationship storage, a correspondence relationship between a plurality of actions and a plurality of time zones, the plurality of actions including a predetermined action that is stored in correspondence with a plurality of predetermined time zones in the correspondence relationship storage;

starting, with a processor, time counting as the enemy character executes the predetermined action of the plurality of actions;

causing, with the processor, the player character to make an attack on the enemy character when an attack operation of the player character on the enemy character is received by a controller;

generating, with the processor, a predetermined effect when a time at which the player character hits the attack on the enemy character is out of all of the plurality of predetermined time zones from a start of the time counting;

generating, with the processor, a special effect different from the predetermined effect when the time at which the player character hits the attack on the enemy character is within one of the plurality of predetermined time zones from the start of the time counting, and displaying a special effect possibility display on a display screen during each of the plurality of predetermined time zones to represent that it is possible to generate the special effect by the attack of the player character on the enemy character, wherein different special effects correspond to each of the plurality of predetermined time zones, the special effect being selected from the different special effects in correspondence with the time at which the player character hits the attack on the enemy character.

18. The game progress method according to claim 17, wherein the plurality of predetermined time zones are inconsecutive in the time counting.

19. The game progress method according to claim 17, wherein the plurality of predetermined time zones have different durations.

20. The game progress method according to claim 17, wherein the plurality of predetermined time zones have different durations, are inconsecutive, and begin a predetermined time period after the start of the time counting.

* * * * *